United States Patent
Al-Hallaj et al.

(10) Patent No.: US 11,050,101 B2
(45) Date of Patent: Jun. 29, 2021

(54) THERMAL STATE OF CHARGE ESTIMATION OF PHASE CHANGE MATERIAL (PCM) IN A BATTERY PACK WITH A PCM THERMAL MANAGEMENT SYSTEM

(71) Applicant: ALL CELL TECHNOLOGIES, LLC, Chicago, IL (US)

(72) Inventors: Said Al-Hallaj, Chicago, IL (US); Mohamad M. Salameh, Chicago, IL (US); Siddique Ali Khateeb Razack, Lombard, IL (US); Benjamin Schweitzer, Seattle, WA (US); Stephen Wilke, Evanston, IL (US); Mahesh Krishnamurthy, Wheaton, IL (US)

(73) Assignee: ALL CELL TECHNOLOGIES, LLC, Chicago, IL (US)

( * ) Notice: Subject to any disclaimer, the term of this patent is extended or adjusted under 35 U.S.C. 154(b) by 152 days.

(21) Appl. No.: 16/487,741

(22) PCT Filed: Jan. 9, 2018

(86) PCT No.: PCT/US2018/012874
§ 371 (c)(1),
(2) Date: Aug. 21, 2019

(87) PCT Pub. No.: WO2018/156251
PCT Pub. Date: Aug. 30, 2018

(65) Prior Publication Data
US 2020/0235446 A1 Jul. 23, 2020

Related U.S. Application Data

(60) Provisional application No. 62/462,041, filed on Feb. 22, 2017.

(51) Int. Cl.
H01M 10/659 (2014.01)
H01M 10/613 (2014.01)
H01M 10/42 (2006.01)
H01M 10/48 (2006.01)

(52) U.S. Cl.
CPC ....... *H01M 10/659* (2015.04); *H01M 10/425* (2013.01); *H01M 10/486* (2013.01); *H01M 10/613* (2015.04); *H01M 2010/4271* (2013.01)

(58) Field of Classification Search
CPC .. H01M 10/425; H01M 10/44; H01M 10/443; H01M 10/48; H01M 10/486;
(Continued)

(56) References Cited

U.S. PATENT DOCUMENTS 6,942,944 B2   9/2005   Al-Hallaj et al.
10,005,941 B2  6/2018   Razack et al.
(Continued)

FOREIGN PATENT DOCUMENTS

| DE | 10 2011 105 366 A1 | 3/2012 |
| DE | 10 2013 225 582 A1 | 6/2015 |
| DE | 10 2015 214 452 A1 | 2/2017 |
| EP | 2 482 021 A2 | 8/2012 |

OTHER PUBLICATIONS

European Patent Office, English language version of the Extended European Search Report, dated Dec. 3, 2020 (7 pages).

*Primary Examiner* — Victoria H Lynch
(74) *Attorney, Agent, or Firm* — Pauley Erickson & Swanson

(57) ABSTRACT

A method and apparatus for determining and/or monitoring a thermal state of charge or melt fraction of phase change material in a battery system. The battery system includes a plurality of electrochemical cell elements, a supply of a phase change material in thermal contact with the plurality of electrochemical cell elements, and a battery management system that monitors a thermal storage capacity of the phase
(Continued)

change material and automatically controls a power of the plurality of electrochemical cell elements as a function of the thermal storage capacity of the phase change material. The battery management system automatically adjusts a power output of the plurality of electrochemical cell elements as a function of the thermal storage capacity of the phase change material to provide a heat output within a predetermined safe temperature limit.

21 Claims, 12 Drawing Sheets

(58) Field of Classification Search
CPC .............. H01M 10/613; H01M 10/651; H01M 10/655; H01M 10/659; H01M 2010/4271; Y02E 60/10
See application file for complete search history.

(56) References Cited

U.S. PATENT DOCUMENTS

| | | |
|---|---|---|
| 2003/0054230 A1* | 3/2003 | Al-Hallaj ............ H01M 10/643 429/120 |
| 2010/0273041 A1 | 10/2010 | Lawall et al. |
| 2011/0167838 A1 | 7/2011 | Danner et al. |
| 2014/0079978 A1 | 3/2014 | Al-Hallaj et al. |
| 2015/0037647 A1 | 2/2015 | Nguyen et al. |
| 2016/0006088 A1 | 1/2016 | Boetcher et al. |

* cited by examiner

THERMAL STATE OF CHARGE ESTIMATION OF PHASE CHANGE MATERIAL (PCM) IN A BATTERY PACK WITH A PCM THERMAL MANAGEMENT SYSTEM

FIELD OF THE INVENTION

This invention relates generally to the use of phase change material (PCM) for thermal management and, more particularly, to a method and apparatus for determining and/or monitoring a thermal state of charge or melt fraction of phase change material.

BACKGROUND OF THE INVENTION

Li-ion batteries are currently used in many applications, such as those in electric vehicles, portable electronics, hybrid electric vehicles, stationary storage systems, etc. Traditionally, cooling of Li-ion battery packs is performed via forced air-cooling and/or liquid cooling, which are generally complex, expensive, heavy, and require high maintenance. Use of phase change material (PCM) for thermal management of Li-ion batteries or other battery chemistries has been proposed in, for example, U.S. Pat. Nos. 6,942,944; 6,468,689; and 8,273,474, herein incorporated by reference.

The heat generated during battery use melts the PCM, and after the battery is resting the PCM cools and solidifies, providing a fully repeatable and reliable thermal management. PCMs for batteries have been implemented in a variety of applications, including transportation, uninterruptable power supplies, aerospace, and on- and off-grid electrical energy storage. By limiting the peak temperatures of the battery pack, PCM can improve electrical performance, system lifetime, and operational safety.

PCM-based thermal management strategies can be very effective to prevent unsafe battery conditions and maintain an optimal temperature for normal operation. In a PCM thermal management system, maximum advantage is obtained during the phase transition of PCM material, where a large amount of latent heat is utilized to absorb the heat released from cells in a battery pack. After complete melting of PCM (in case of solid-liquid PCM), battery pack temperature can rise very sharply. PCM thermal management systems are typically designed to not operate after complete melting of PCM. In current applications of PCM for battery thermal management, the control system regulates the flow of current into and out of a battery pack by monitoring various battery parameters to ensure safe battery operation.

The current state-of-art control systems in commercial battery packs monitors current, voltage, state of charge, and/or overall battery pack temperature, and controls the operation of the battery pack. In air or liquid cooling systems, the battery pack temperature is continuously monitored and air or liquid flow is turned on when the battery pack temperature exceeds a set-point temperature, and turned off when the battery pack is lower than set-point temperature. Thus, a dedicated control system is designed as part of an air or liquid cooling system. In a PCM based cooling system, a sophisticated control system is not required based of its simple passive operation with no moving parts. However, there is a continuing need to monitor the PCM so that the control system can always operate the battery pack safely per the available latent heat storage in PCM and not operate the battery pack when the PCM is completely melted

SUMMARY OF THE INVENTION

A general object of the invention is to provide a battery management system (BMS) that is specifically designed for battery packs using phase change material(s) (PCM) for thermal management. The method and BMS of this invention have enhanced capability to predict or otherwise determine the melt fraction or thermal state-of-charge (TSoC) of the PCM.

As an example, if T-SoC is 0%, then the entire PCM is melted and in liquid phase, and if T-SoC is 100%, then the entire PCM is in solid state and can absorb a large amount of heat from battery pack. During battery pack operation, if T-SoC is at or near 100% but the battery pack capacity is still available and below a temperature limit, then the BMS will limit the power to safe level. The BMS thus controls the battery pack power as per the T-SoC or melt fraction of the PCM.

Current control technology does not address the above-mentioned problem of estimating the melt fraction of PCM for battery cooling application. This invention includes a method that can be implemented in a new or existing control system for estimating the melt fraction of PCM in the battery pack when using PCM for cooling application based upon a few input parameters such as current and ambient temperature. The added intelligence for a BMS provided by this invention allows for safer operation of the battery pack as per melt fraction of PCM and available latent heat storage. The intelligent BMS system of embodiments of this invention relies on a few parameters to estimate the PCM temperature, PCM melt-fraction, and/or available heat storage. The BMS system accordingly adjusts the battery power output, and performs a similar function when the battery pack is charged.

Another important advantage of embodiments of this invention is that accurately estimating the melt fraction or available thermal storage capacity of a PCM will help to mitigate the thermal runaway propagation of cells in a battery pack. With insufficient PCM latent heat available, the cells in a battery pack can propagate in an event of thermal runaway of a single cell because the released heat cannot be sufficiently stored in PCM.

Another advantage of this invention is that the electronics and control network for a battery pack are highly simplified by eliminating the need for numerous temperature sensors to estimate PCM temperature and melt fraction. Embodiments of this invention require fewer sensors and rely on a new methodology to calculate the battery pack temperature, and/or PCM temperature.

The general object of the invention can be attained, at least in part, through a novel battery management system (BMS) for monitoring a thermal storage capacity of phase change material (PCM), and controlling the behavior of a battery pack to maintain an optimal power for safe temperature limits, thereby mitigating thermal runaway of battery pack. The invention further includes a method, such as implemented in the BMS, to estimate the battery state of charge, battery heat generation, battery temperature, and melt-fraction of PCM. The invention further includes a novel control strategy that can control the battery pack to operate safely and then control behavior of battery load such as electric motor per battery pack available energy and temperature.

The invention includes a battery system with a plurality of electrochemical cell elements, and a supply of a phase change material having a thermal conductivity and in thermal contact with the plurality of electrochemical cell elements whereby the phase change material absorbs at least a portion of heat generated upon a charge or discharge of electric power from the plurality of electrochemical cell elements. A battery management system monitors a thermal storage capacity of the phase change material and automatically controls a power of the plurality of electrochemical cell elements as a function of the thermal storage capacity of the phase change material. The battery management system desirably automatically determines or estimates more than one of: a battery state of charge, a battery heat generation, a battery temperature, and a melt-fraction of the phase change material. The battery management system automatically adjusts a power output of the plurality of electrochemical cell elements as a function of the thermal storage capacity of the phase change material to provide a heat output within a predetermined safe temperature limit. In embodiments of this invention, the battery management system includes: an electro-thermal module configured to determine and output electrochemical cell heat generation; a battery thermal module configured to determine and output battery temperature; and a melt-fraction module configured to estimate a remaining thermal storage capacity of the phase change material state of charge.

In embodiments of this invention, the battery management system automatically predicts or estimates a melt fraction or a thermal state-of-charge of the phase change material. The battery management system can predict or estimate the melt fraction or the thermal state-of-charge of the phase change material as a function of latent heat of the phase change material. Sensors for at least one of: electrical current, electrochemical cell element temperature, and ambient temperature are desirably placed at various positions on or throughout the battery module and provide data usable by the battery management system to predict or estimate the melt fraction or the thermal state-of-charge of the phase change material. For example, the battery management system can predict or estimate the melt fraction or the thermal state-of-charge from predetermined values using measured temperatures throughout the supply of phase change material.

The invention further includes a battery system including an electrochemical cell array with a plurality of electrochemical cell elements and a thermal management matrix at least in part enveloping the electrochemical cell array and in thermal contact therewith. The thermal management matrix, such as formed of a graphite or a polymer composite based lattice, includes a supply of phase change material disposed at least in part in a heat conductive lattice. The thermal management matrix dissipates at least a portion of heat generated upon activation of at least a portion of the electrochemical cell array enveloped by the thermal management matrix. A battery management system is provided for monitoring a thermal storage capacity of the thermal management matrix as a function of a melt fraction or a thermal state-of-charge of the phase change material. Adjacent electrochemical cell elements are at least in part spaced apart by the thermal management matrix, and the phase change material is, for example, an encapsulated hydrated salt with a phase change temperature of about 5° C. to 85° C.

The invention further includes a method of operating a power supply system. The method includes: discharging at least one cell element to produce a quantity of power and a quantity of heat; absorbing at least a portion of the quantity of heat in a phase change material in thermal contact with the discharging cell element; subsequently releasing at least a portion of the absorbed quantity of heat from the phase change material to heat the at least one cell element; monitoring a thermal storage capacity of the phase change material; and adjusting a power output of the at least one cell as a function of the thermal storage capacity. The method can further include steps of determining a cell element heat generation; determining a power supply system temperature; and estimating the thermal storage capacity of the phase change material state of charge as a function of the determined cell element heat generation and power supply system temperature.

Other objects and advantages will be apparent to those skilled in the art from the following detailed description taken in conjunction with the appended claims and drawings.

DETAILED DESCRIPTION OF THE INVENTION

The present invention generally provides an improved power supply system and method of operation. More particularly, the invention provides an improved power supply system and method of operation such that provide or result in improved thermal management such as wherein undesired temperature excursions and non-uniformity of temperature can be appropriately reduced, minimized or otherwise suitably managed.

The present invention provides an apparatus and method for estimating thermal state of charge (T-SoC) or melt fraction of the PCM of a phase change composite used in battery packs. In embodiments of this invention, once the T-SoC or PCM melt fraction is estimated and computed by a battery management system (BMS), another battery algorithm is executed in real-time by the BMS to adjust battery pack's performance and available power to ensure sufficient PCM latent heat is available to store the battery heat. The battery pack's modulated power and energy status can then be communicated, such as by a communication module of the BMS, to the motor controller and/or user. In this manner, available storage capacity of PCM is synchronized with battery power which in turn regulates the motor and vehicle power via a novel methodology implemented in the battery's BMS.

Figure 1:
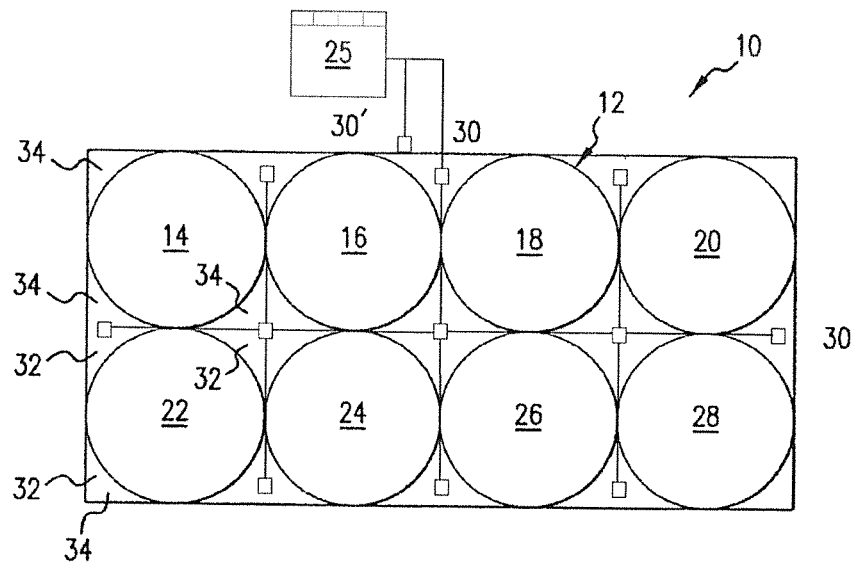
FIG. 1 is a top view schematic of a battery module incorporating a thermal management system in accordance with one embodiment of the invention.

The present invention may be embodied in or with a variety of different battery structures. As representative, FIG. 1 illustrates an exemplary battery module, generally designated by the reference numeral 10. The battery module 10 includes a cell package 12 composed of eight (8) cell elements 14, 16, 18, 20, 22, 24, 26 and 28 such as known in the art. A representatively shown BMS 25 is in sensing and control combination with the battery module 10, and is connected to an array of more than one sensor 30, and desirably a plurality of sensors 30 throughout the module 10 as needed, and one or more optional sensors 30' external of the module 10 for sensing and/or measuring surrounding external temperatures. The number and placement of the sensors can vary depending on need and the materials and/or configuration of the module 10.

Figures 2, 3:
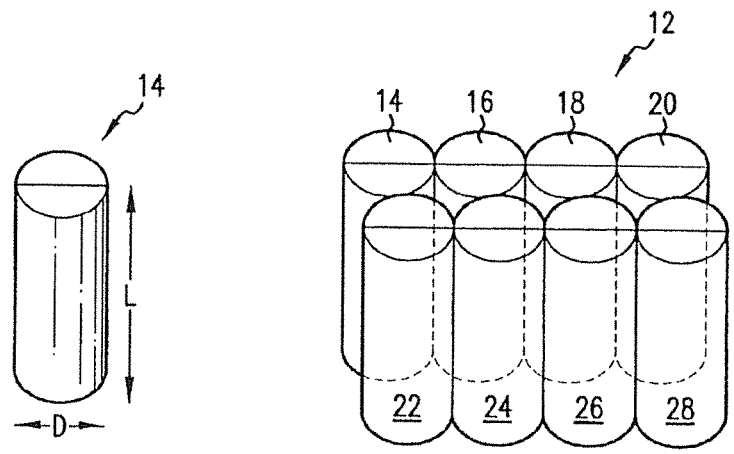
FIG. 2 is a perspective schematic of a cell element used in the battery module shown in FIG. 1.
FIG. 3 is a perspective schematic of the cell elements used in the battery module shown in FIG. 1.

FIG. 2 illustrates the cell element 14 in isolation and in greater detail. As shown, the cell element 14 has a generally cylindrical shape composed of a length L and a width D. While such shaped cell elements are common and well known, the broader practice of the invention is not necessarily so limited as cell elements having other desired shapes or sizes can, if desired, be used alone or in combination. FIG. 3 illustrates the cell package 12 in isolation and in greater detail.

Returning to FIG. 1, the battery module 10 forms or includes void spaces, generally designated by the reference numeral 32, between the various adjacent cell elements 14, 16, 18, 20, 22, 24, 26 and 28 of the cell package 12. In accordance with a preferred practice of the invention, such battery module voids are filled or otherwise appropriately contain a suitable phase change material (PCM), generally designated by the reference numeral 34 and such as described in greater detail below, such as to facilitate desired thermal management within such a power supply system. In particular, in the illustrated embodiment, the phase change material 34 surrounds each of the cell elements 14, 16, 18, 20, 22, 24, 26 and 28, and is in general thermal contact therewith.

In accordance with one preferred embodiment of the invention, the so included or incorporated phase change material 34 can desirably serve or act as a heat sink to absorb excess heat generated within the module 10 such as during the relatively highly exothermic process of battery discharge or charge. In particular, the heat generated from the cells 14, 16, 18, 20, 22, 24, 26 and 28 during discharge can be stored, at least temporarily in the phase change material 34 as latent heat.

Thus, the phase change material 34 permits the storage of such heat for later or subsequent use or utilization. For example, the heat stored or otherwise contained within such phase change material can later be appropriately released or, as commonly referred to, "rejected" for appropriate use in or in conjunction with the battery module 10. In particular, such stored heat can be appropriately rejected to the cell module during relaxation and keep the cells at an elevated temperature above the surrounding temperature for an extended period of time. For example, such heat can be later rejected such as when the battery temperature drops such as during battery charge or under cold weather conditions.

Various phase change materials, such as known in the art, can suitably be used in the practice of the invention. For example, suitable phase change materials for use in Li-ion battery applications desirably will have a melting point in the range of about 5° C. to about 85° C., desirably about 15° C. to about 85° C., and in some embodiments preferably between about 30° C. and 60° C., as well as desirably have a high latent heat per unit mass ratio, and a narrow melting temperature range. Further, phase change materials for use in the practice of the invention will also desirably be thermally cyclable, non-hazardous, non-contaminant, non-reactive or otherwise inert with respect to other battery components, nontoxic, cheap and of relatively light weight or density. Suitable phase change materials may generally include paraffin waxes such as are relatively inexpensive, not easily or prone to decomposition and which generally have a relatively low melting temperature within the recommended range of operation for Li-ion cells.

Other exemplary PCM materials include hydrated salts, such as encapsulated hydrated salt with a phase change temperature of about 5° C. to 85° C. Salt hydrates include a salt and water in a discrete mixing ratio, typically with an integral number of water molecules per ion pair of the salt, whereby a stable crystal structure forms. The bonds are usually ion-dipole bonds or hydrogen bonds. The water molecules are located and oriented in the structure in a well-defined manner. Table I includes exemplary salt hydrates for use as PCM. As an example, magnesium chloride hexahydrate $MgCl_2 \cdot 6H_2O$, is a lattice structure that includes two parts: Cl-ions, and 6 water molecules oriented octahedral around a magnesium ion $Mg^{2+}$ and bound by ion-dipole bonds. Due to the stable crystal structure of salt hydrates, the melting temperature is higher than for water.

TABLE I

| Material | Composition, wt. % | Melting point, ° C. | Heat of fusion, kJ/kg | Thermal conductivity |
|---|---|---|---|---|
| $Ca(NO_3)_2 \cdot 4H_2O$ + $Mg(NO_3)_2 \cdot 6H_2O$ | 47 + 53 | 30 | 136 | |
| $NH_4NO_3$ + $Mg(NO_3)_2 \cdot 6H_2O$ | 38.5 + 61.5 | 52 | 125.5 | 0.494(L) 0.552(s) |
| $MgCl_2 \cdot 6H_2O$ + $Mg(NO_3)_2 \cdot 6H_2O$ | 41.3 + 58.7 | 59 | 132.2 | 0.565(L) 0.678(s) |
| $Al(NO_3)_2 \cdot 9H_2O$ + $Mg(NO_3)_2 \cdot 6H_2O$ | 47 + 53 | 61 | 148 | |
| $CaCl_2 \cdot 6H_2O$ + $MgCl_2 \cdot 6H_2O$ | 66.6 + 33.3 | 25 | 127 | |

Alternatively, those skilled in the art and guided by the teachings herein provided will appreciate that chlorobenzene and bromobenzene crystallize with very similar structure and have a low and narrow temperature range of crystallization. Thus, mixtures of chlorobenzene and bromobenzene may be suitable for particular applications such as involving precise temperature control between about 30° C. to about 45° C., for example. Other possible or suitable phase change materials for such applications may include stearic acid which has a melting point of about 70° C., and various commercially available esters of stearic acid with methyl, propyl and butyl alcohols, having melting points in the range of about 17° C. to about 34° C. Another candidate phase change material for use in the practice of the invention is polyethylene glycol (PEG). Potential or possible problems or concerns with thermal degradation by or of PEG may, however, prevent, limit or otherwise restrict such use or application. In view of the above, it is to be understood that the broader practice of the invention is not necessarily limited or restricted to the use of or the practice in conjunction with specific or particular phase change materials.

Figure 4:
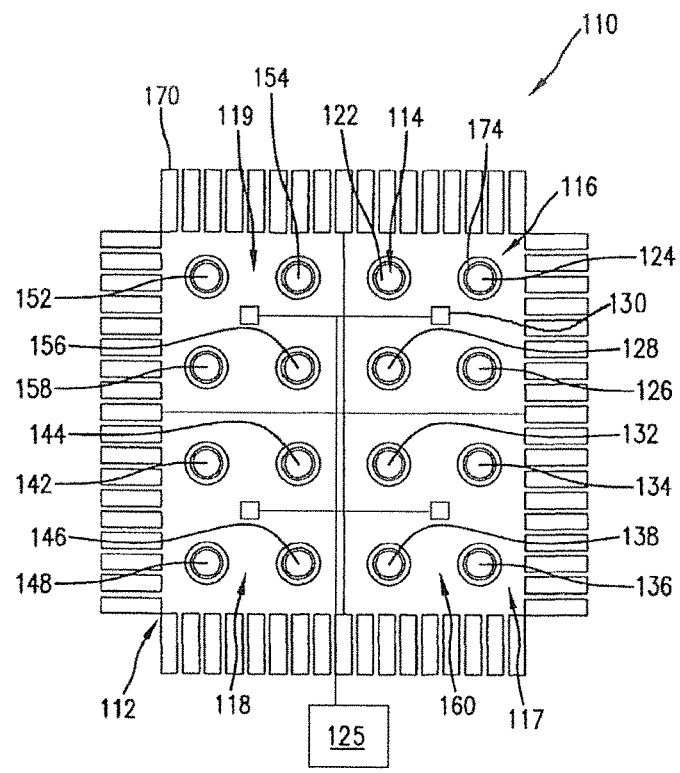
FIG. 4 is a top view schematic of a battery module incorporating a thermal management system in accordance with another embodiment of the invention.

Embodiments of this invention incorporate a heat-conductive containment lattice member having a plurality of openings wherein at least a portion of the supply of the phase change material is disposed. Such invention can be embodied in a variety of different forms or structures. As representative, FIG. 4 illustrates a battery module, generally designated by the reference numeral 110 and incorporating a thermal management system in accordance one such embodiment of the invention. The battery module 110 generally includes a housing 112, such as made of plastic or other polymer and which is preferably electrically insulating, and a plurality of electrochemical cell elements, generally designated by the reference numeral 114, housed or contained within the module housing 112, as described below.

In the illustrated embodiment, the battery module 110 is divided into four generally equally shaped and sized module quadrants 116, 117, 118 and 119, respectively. Each of the module quadrants includes or contains four electrochemical cell elements 114. For example, the module quadrant 116 includes or contains the electrochemical cell elements 122, 124, 126 and 128; the module quadrant 117 includes or contains the electrochemical cell elements 132, 134, 136 and 138; the module quadrant 118 includes or contains the electrochemical cell elements 142, 144, 146 and 148; and the module quadrant 119 includes or contains the electrochemical cell elements 152, 154, 156 and 158. A BMS 125 is connected to sensors 130 disposed as needed within each of the module quadrants 116, 117, 118 and 119.

In the illustrated embodiment, the cell elements are Li-ion cells each having a capacity of 1.8 Ah with a diameter (corresponding to D shown in FIG. 2) of 18 mm and a height or length (corresponding to L shown in FIG. 2) of 65 mm. The four cells in each of the module quadrants are connected in series and the four quadrants are in turn connected in parallel to provide or result in a total nominal capacity of 7.2 Ah and a total nominal voltage of 14.68 V.

Those skilled in the art and guided by the teachings herein provided will, however, appreciate that the broader practice of the invention is not necessarily limited by the size, shape, number, form or type of cell elements or the fashion or technique by which two or more of such cell elements or module units may be joined or connected.

Figure 5:
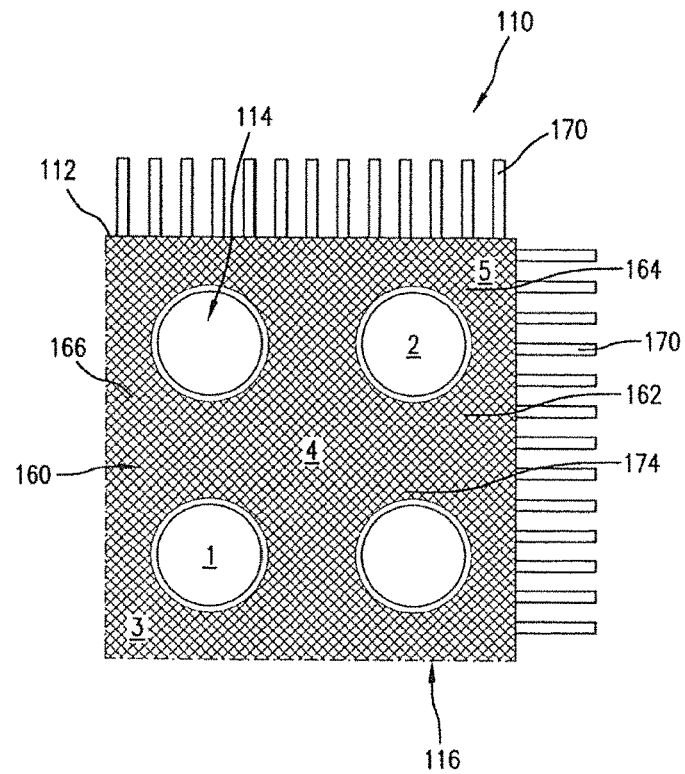
FIG. 5 is a top view schematic of a specified quadrant of the battery module shown in FIG. 4.

FIG. 5 illustrates the module quadrant 116 in isolation and in greater detail. Returning to FIG. 4, the battery module 110 forms or includes void spaces, generally designated by the reference numeral 160, between the various cell elements 114. In accordance with a preferred practice of the invention, such battery module voids 160 are at least in part filled or otherwise appropriately contain a supply of a suitable phase change material (PCM), generally designated by the reference numeral 162 and such as described in detail above, such as to facilitate desired thermal management within such a power supply system.

As in various of the above-described embodiments, the phase change material 162 desirably surrounds and is in general thermal contact with the cell elements 114. The so included or incorporated phase change material 162 can desirably serve or act as a heat sink to absorb excess heat generated within the module 110 such as during the relatively highly exothermic process of battery discharge or charge, such as with the phase change material 162 desirably undergoing a reversible change of phase when absorbing or releasing a sufficient quantity of heat. In particular, the heat generated from the cells 114 during discharge can be stored, at least temporarily in the phase change material 162 as latent heat.

Thus, the phase change material 162 permits the storage of such heat for later or subsequent use or utilization. For example, the heat stored or otherwise contained within such phase change material can later be appropriately released or, rejected for appropriate use in or in conjunction with the battery module 110. In particular, such stored heat can be appropriately rejected to the cell module during relaxation and keep the cells at an elevated temperature above the surrounding temperature for an extended period of time. For example, such heat can be later rejected such as when the battery temperature drops such as during battery charge or under cold weather conditions.

As identified above, various phase change materials, such as known in the art, can suitably be used in the practice of the invention. For example and as identified above, suitable phase change materials for use in Li-ion battery applications desirably will have a melting point in the range of between about 30° C. and 60° C., a high latent heat per unit mass ratio, and a narrow melting temperature range. Further, phase change materials for use in the practice of the invention will also desirably be thermally cyclable, non-hazardous, non-contaminant, non-reactive or otherwise inert with respect to other battery components, nontoxic, cheap and of relatively light weight or density. Thus, suitable such phase change materials may generally include paraffin waxes such as are relatively inexpensive, not easily or prone to decomposition and which generally have a relatively low melting temperature within the recommended range of operation for Li-ion cells.

In accordance with a preferred practice of this embodiment of the invention, the housing 112 also contains a heat-conductive containment lattice member 164 such as desirably fills or is otherwise appropriately contained or positioned within the battery module voids 160. The heat-conductive containment lattice member 164 is perhaps best viewed making reference to FIG. 5.

The containment lattice member 164 desirably includes a plurality of openings or pores 166, the use of which will be described in greater detail below. The containment lattice member 164 is desirably formed of a heat-conductive material such as of metal, graphite or a composite thereof, for example. Particular preferred containment lattice member materials for use in the practice of the invention include, for example, various screen and foam materials such as graphite foam and metal foams such as aluminum foam and particularly open-celled forms of such foams, for example. In accordance with a preferred practice of the invention, at least a portion of the phase change material supply 162 is disposed in the openings 166 of the containment lattice member 164.

As will be appreciated by those skilled in the art and guided by the teachings herein provided, the inclusion of a containment lattice member can desirably serve to more uniformly distribute heat generated upon a charge or discharge of electric power from the electrochemical cell elements as compared to an otherwise identical battery module without the containment lattice member. In accordance with a preferred embodiment of the invention, the containment lattice member has a thermal conductivity which is an order of magnitude greater than the thermal conductivity of the phase change material. In one particular preferred embodiment it has been found desirable that the containment lattice member have a thermal conductivity of at least about 10 $W \cdot m^{-1} \cdot K^{-1}$ The battery module 110 includes an optional plurality of protruding heat transfer fins 170. More particularly, such heat transfer fins 170 outwardly-extend from the housing 112. Such heat transfer fins can typically be constructed or formed of a relatively light weight formable heat conducting metal such as aluminum or the like. As will be appreciated, however, such heat transfer fins 170 can be variously formed or constructed such as suitably joined or connected to the housing 112 or, as may be preferred, suitably joined or attached to the containment lattice member 164 such as to be in thermal communication therewith. As will be appreciated by those skilled in the art and guided by the teachings herein provided, various form or constructions of heat transfer fins can be utilized or incorporated in the practice of the invention and the broader practice of the invention is not necessarily limited to use of or practice with particular forms or types of heat transfer fins.

As will be appreciated by those skilled in the art and guided by the teachings herein provided, the presence or inclusion of such heat transfer fins or the like facilitate the utilization of external active cooling wherein a selected cooling medium (e.g., such as based on forced circulation of air, liquid or other selected cooling medium) is circulated externally to the battery module 110 such as via a fan (not shown), for example.

While the broader practice of the invention is not necessarily limited to the use of or practice with containment lattice members which contain or include a certain porosity, it has been found to be generally preferred that containment lattice members employed in the practice of the invention desirably contain or include a porosity or open volume of at least 20%. As will be appreciated, higher porosities permit or allow for higher loading of the phase change material therein.

It has been found generally desirable in particular implementations to dispose a quantity of an electric insulator 174 about each of the cell elements 114 to minimize or avoid undesired electrical contact by and between the electrochemical cell elements 114 and the containment lattice member 164. Various insulator materials, such as various plastics, such as known in the art can be employed in the practice of the invention. It is to be understood that the broader practice of the invention is not necessarily limited to the use or practice with particular insulator materials.

While this embodiment of the invention has been described making specific reference to Li-ion cells, it is to be understood that various suitable cell elements can be used in the practice of such embodiment including rechargeable cell elements and fuel cell batteries such as utilize or employ hydrogen or methanol as a fuel, for example.

Figure 6:
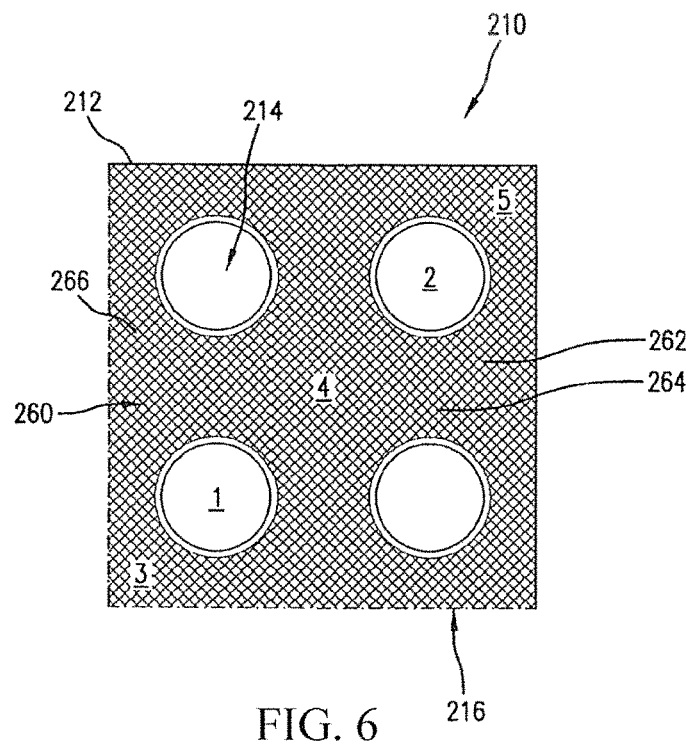
FIG. 6 is a top view schematic of a battery module quadrant, similar to that shown in FIG. 4 but now of a battery module in accordance with another embodiment of the invention.

Further, it will be appreciated that in some applications it may be desirable to employ an embodiment without such heat transfer fins. For example, FIG. 6 illustrates for a battery module 210, a module quadrant 216 generally similar to the module quadrant 116 described above but now without the presence or inclusion of heat transfer fins. The battery module 210 includes a housing 212 and a plurality of electrochemical cell elements, generally designated by the reference numeral 214, housed or contained within the module housing 212. As in the above-described embodiment, the battery module 210 forms or includes void spaces, generally designated by the reference numeral 260, between the various cell elements 214. Such battery module voids 260 house or contain a heat-conductive containment lattice member 264. The containment lattice member 264 desirably includes a plurality of openings or pores 266 wherein disposed or contained is a suitable phase change material (PCM), generally designated by the reference numeral 262 and such as above-described.

Figure 7:
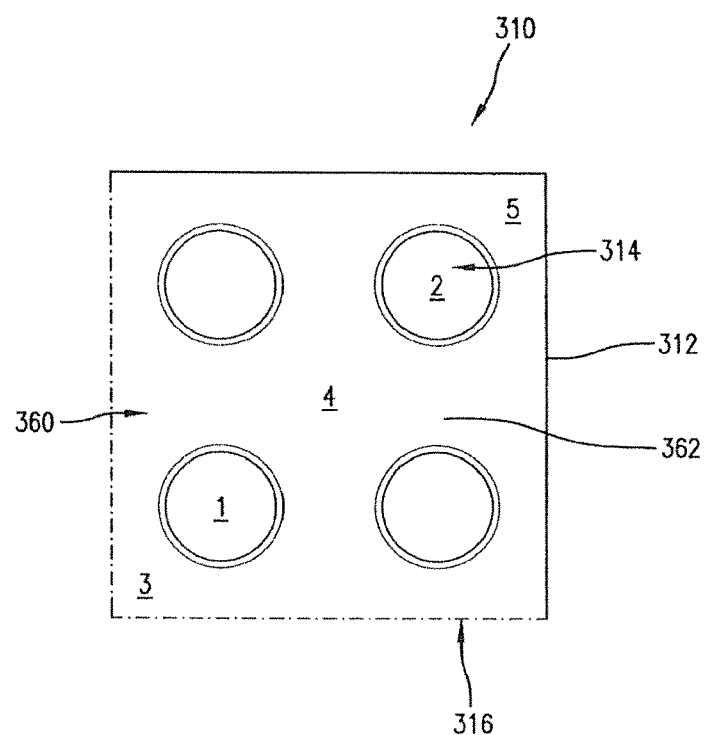
FIG. 7 is also a top view schematic of a battery module quadrant, similar to that shown in FIG. 4 but now of yet another battery module in accordance with the invention.

FIG. 7 illustrates for a battery module 310, a module quadrant 316 generally similar to the module quadrant 116 described above but now without the presence or inclusion of heat transfer tins or a heat-conductive containment lattice member wherein a phase change material (PCM) is disposed. The battery module 310 includes a housing 312 and a plurality of electrochemical cell elements, generally designated by the reference numeral 314, housed or contained within the module housing 312. As in above-described embodiments, the battery module 310 forms or includes void spaces, generally designated by the reference numeral 360, between the various cell elements 314. Such battery module voids 360 house or contain the phase change material (PCM), generally designated by the reference numeral 362, such as above-described.

The invention includes a battery management system (BMS) that monitors a thermal storage capacity of the thermal management matrix as a function of a melt fraction or a thermal state-of-charge of the phase change material. The BMS can be or include any suitable processor and recordable memory device with executable encoded software instructions for processing sensor data for monitoring and controlling the battery module. In embodiments of the invention, the BMS includes hardware and/or software modules selected from: an electro-thermal module configured to determine and output electrochemical cell heat generation; a battery thermal module configured to determine and output battery temperature; and a melt-fraction module configured to estimate a remaining thermal storage capacity of the phase change material state of charge.

Figure 8:
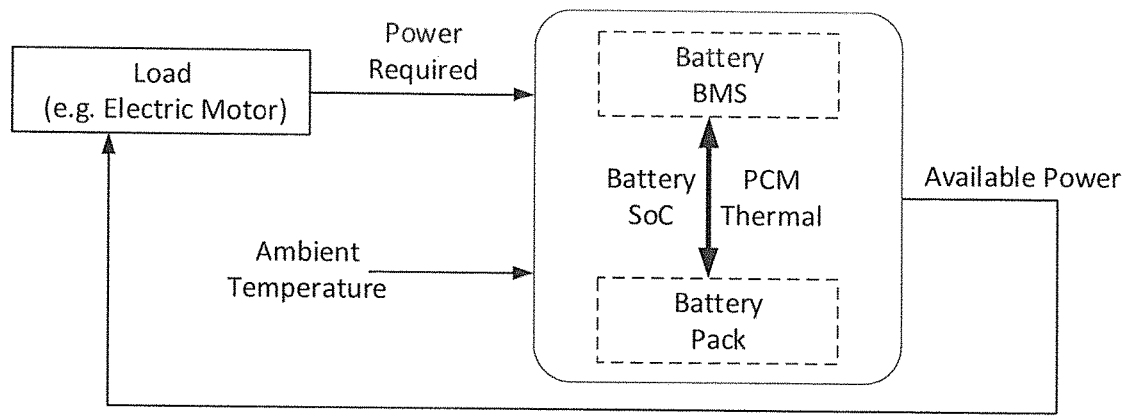
FIG. 8 illustrates an exemplary schematic of battery BMS computation in accordance with embodiments of the invention.

FIG. 8 shows a simple schematic of battery BMS computation according to one embodiment of this invention. In FIG. 8, the current power requirement of the load, the battery state of charge, and the current ambient temperature are determined and used to continually/periodically and automatically estimate a PCM thermal state of charge. The measured variables are continually or periodically updated and used in a model calculation to estimate the thermal state of charge. The available power is desirably determined and adjusted as a function of the thermal state of charge.

Figure 9:
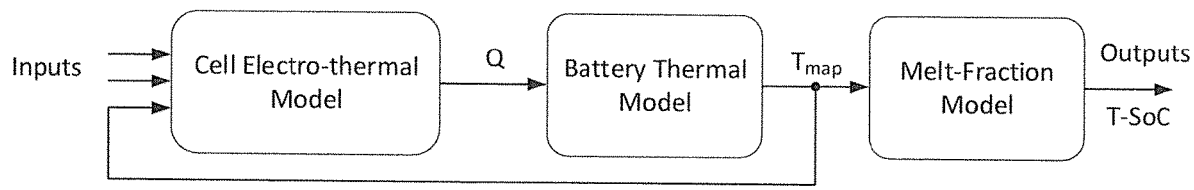
FIG. 9 illustrates a thermal state of charge estimation model in accordance with embodiments of the invention.

The invention measures or otherwise determines PCM state of charge for thermal storage capacity. In embodiments of this invention, integration with the BMS of a battery pack is performed by integrating three sub-models shown in FIG. 9. The outputs from each sub-model are sent to the BMS for processing the inputs and controlling the battery pack power output and intended application. As shown in FIG. 9, the three sub-models include a cell electro-thermal model which outputs cell/battery heat generation; a battery thermal model which outputs battery pack temperature, which is input into the PCM; and a melt-fraction model to estimate a PCM state of charge for the remaining thermal storage capacity.

In embodiments of this invention, the estimation of T-SoC is accomplished using a combination of a temperature sensor network and a battery electro-thermal model. The temperature sensors are placed at various locations throughout the battery pack, such as shown in FIGS. 1 and 4, depending on need and the configuration of the battery pack, and are inputs to the estimation algorithm.

Figure 10A:
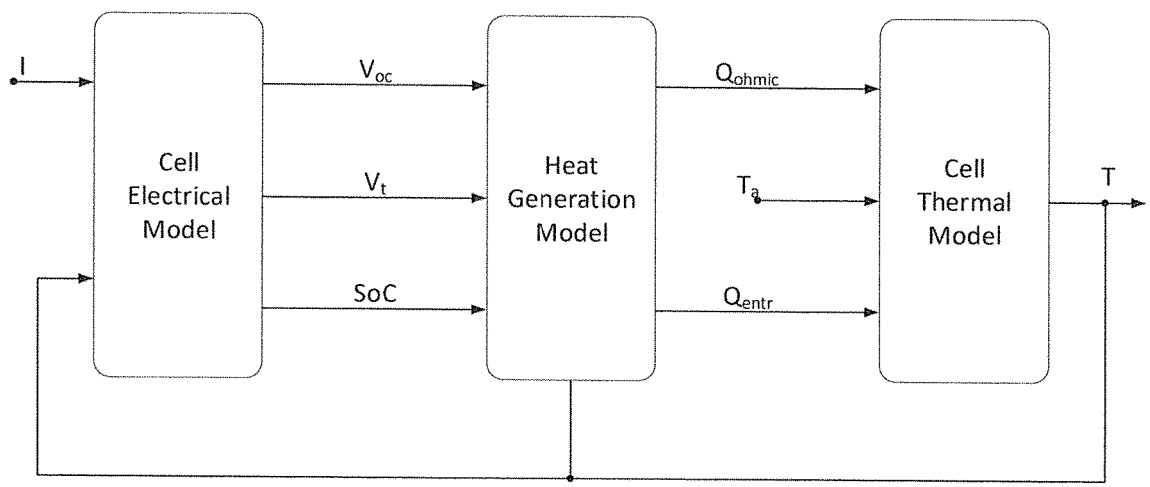
FIG. 10A illustrates a cell electro-thermal model.
Figure 10B:
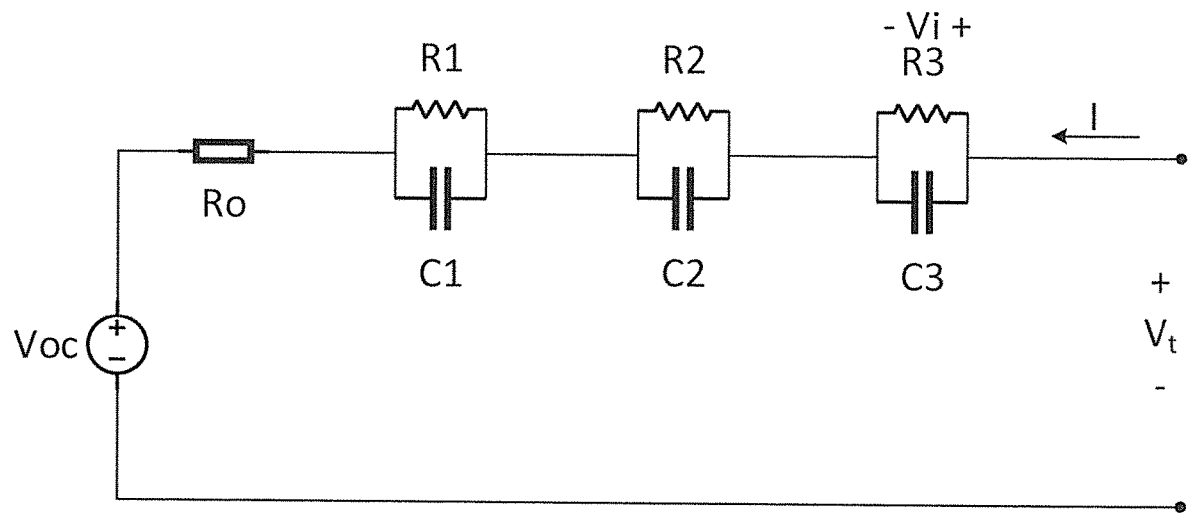
FIG. 10B illustrates a cell electrical model.

FIG. 10A shows an exemplary electro-thermal model, and FIG. 10B shows a corresponding battery electrical model that treats each cell as an equivalent circuit of an ohmic resistor and three resistor-capacity (RC) pairs, to represent the electrochemical processes inside the cell. The parameters for the resistors and capacitors are pre-determined as a function of temperature and cell electrical state of charge using cell-level characterization pulse testing, and the values are used as a lookup table for the algorithm. Cell heat generation is calculated using the irreversible (Ohmic) heating and the reversible (entropic) heating. For reversible heat generation, the cell entropic coefficients are pre-determined using cell-level temperature variation experiments.

Figure 11:
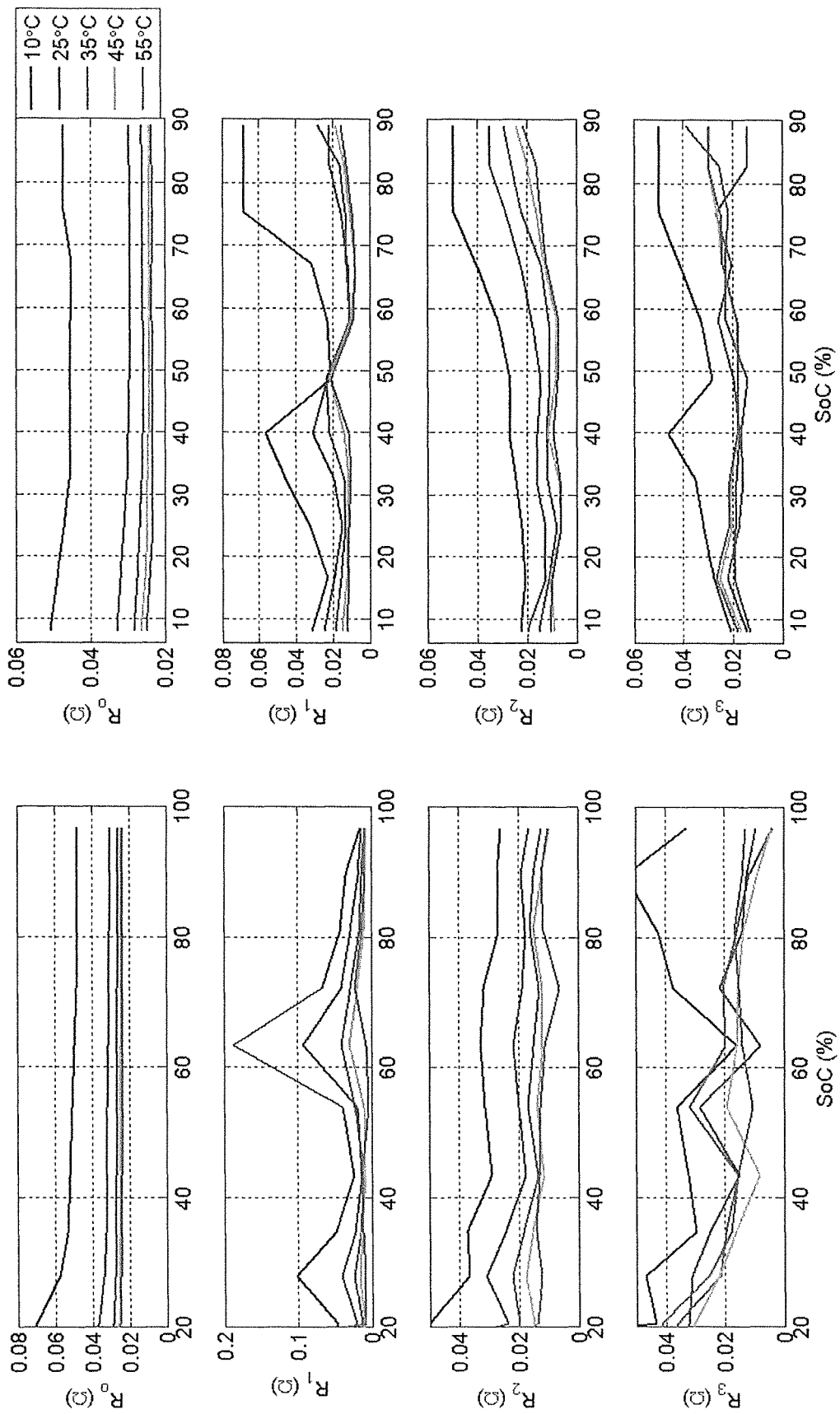
FIG. 11 shows parameters identification results for discharge and charge.

Electrical model circuit parameters can be identified using pulse relaxation test at different values of SoC and temperature, and for charging and discharging. Exemplary identified values are shown in FIG. 11.

Figure 12A:
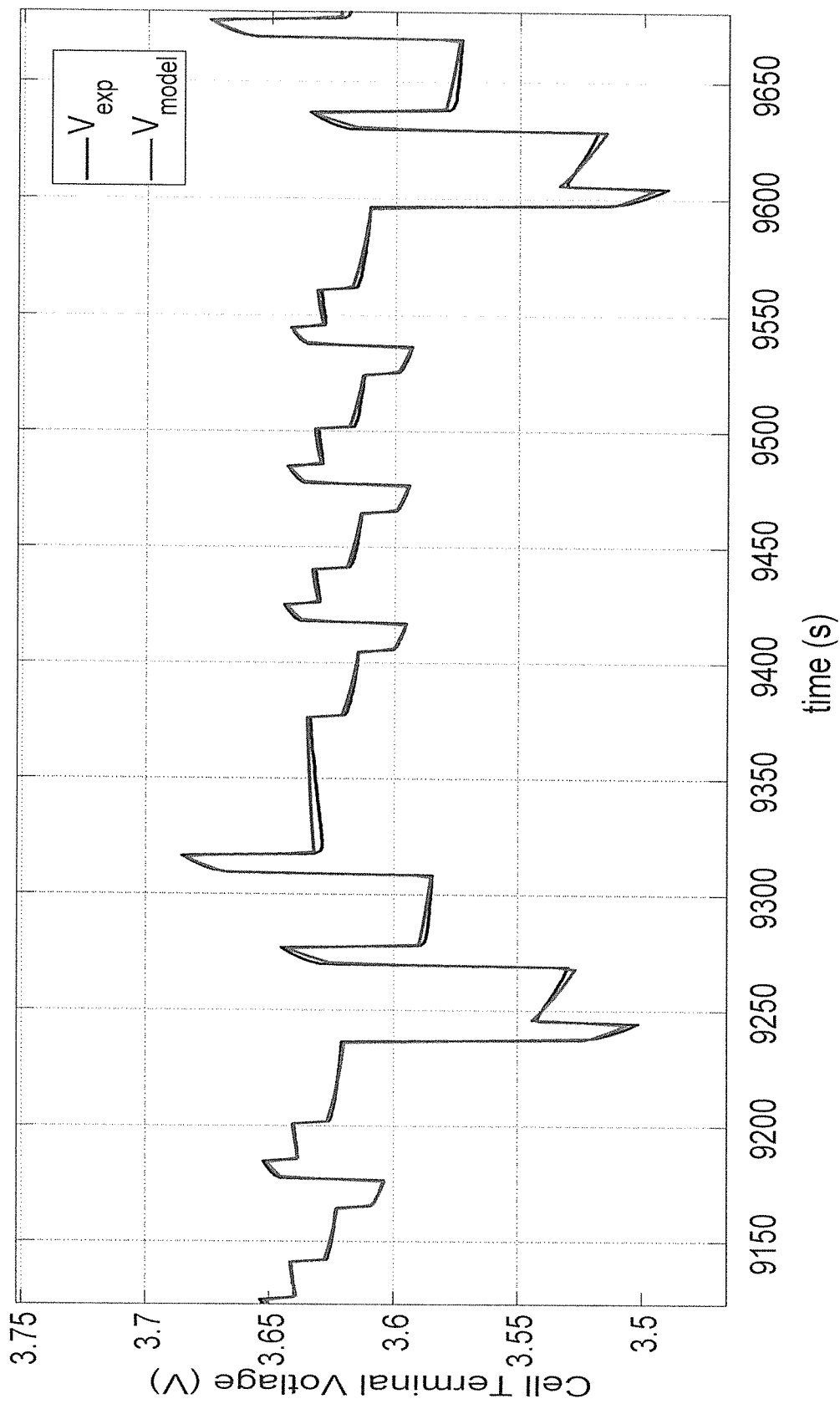
FIG. 12A shows a comparison between estimated and measured terminal voltage.
Figure 12B:
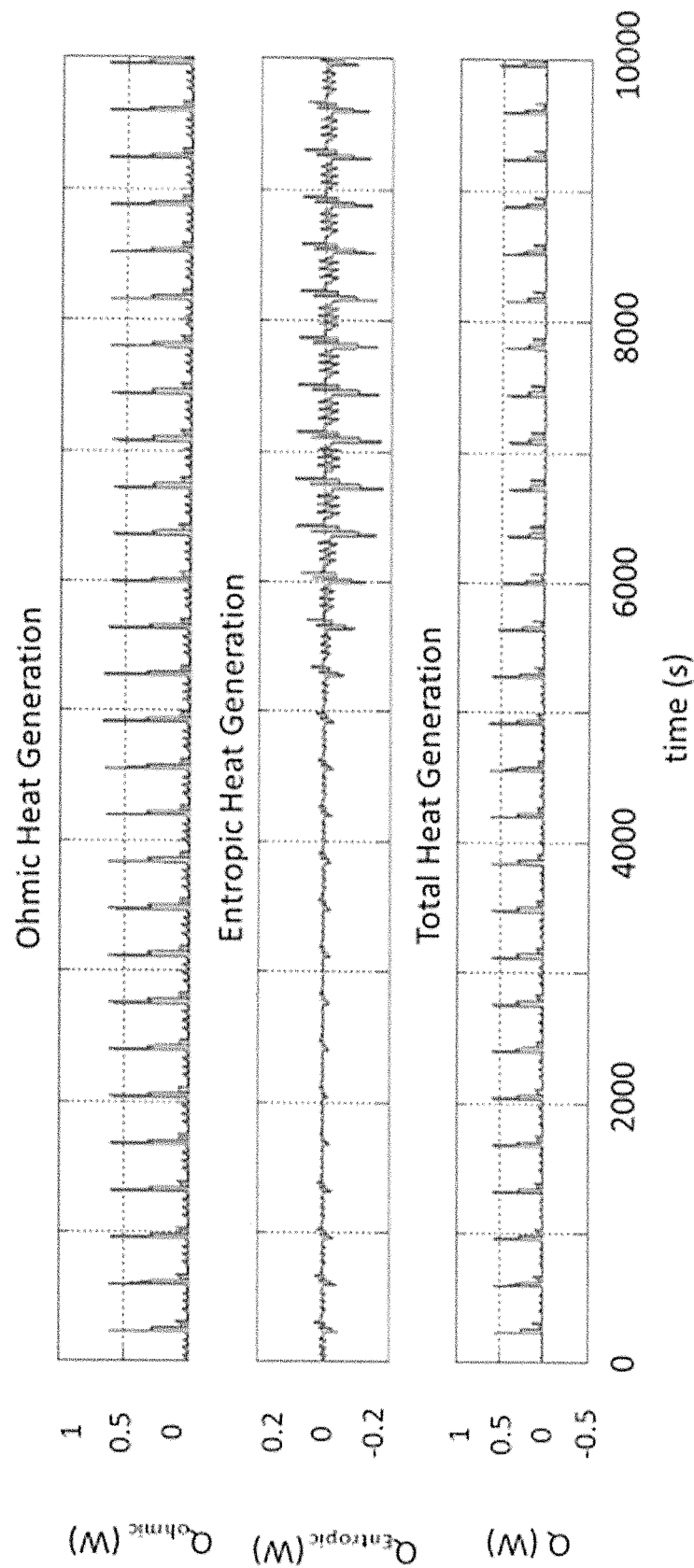
FIG. 12B illustrates estimated cell heat generation.

The accuracy of the electro-thermal model was validated by a dynamic stress test current profile. As shown in Table II, the average error in the estimation of the terminal voltage was less than or approximately 1%; this accuracy will guarantee accurate estimation of the cell heat generation. FIGS. 12A-B show a sample of the estimated and the measured terminal voltage, and the estimated heat generation as well.

TABLE II

Summary of average Error - ETM

| | T (° C.) | | | | | | | |
|---|---|---|---|---|---|---|---|---|
| | 10 | | 25 | | 35 | | 45 | |
| C-Rate | 2 | 3 | 2 | 3 | 2 | 3 | 2 | 3 |
| Average Error % | 0.79 | 0.63 | 0.49 | 0.48 | 0.52 | 1.01 | 0.29 | 0.30 |
| Average Absolute Error (mV) | 28.6 | 22.7 | 17.3 | 17.0 | 18.9 | 36.9 | 10.5 | 10.8 |

Figure 13:
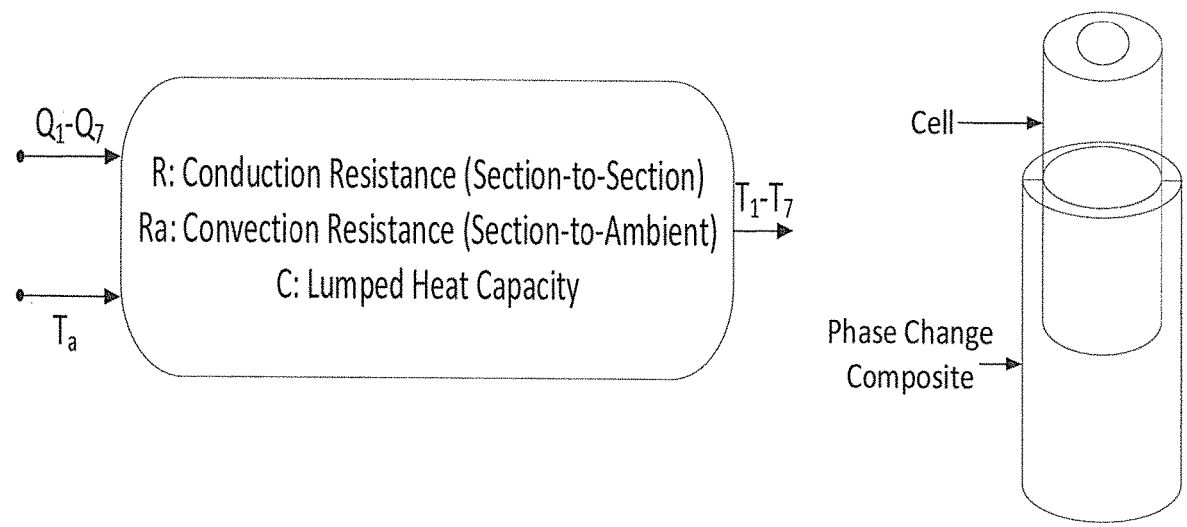
FIG. 13 shows a battery thermal model and a single section (node) composed from a cell surrounded by phase change material.

An exemplary battery thermal model, summarized in FIG. 13, treats each cell as a node in an equivalent thermal circuit of resistors and capacitors, in which the resistors represent conduction and convection resistances and the capacitors are the sensible and latent heats of the cells and phase change material. The cell thermal properties are predetermined using standard thermal characterization.

Figure 14A:
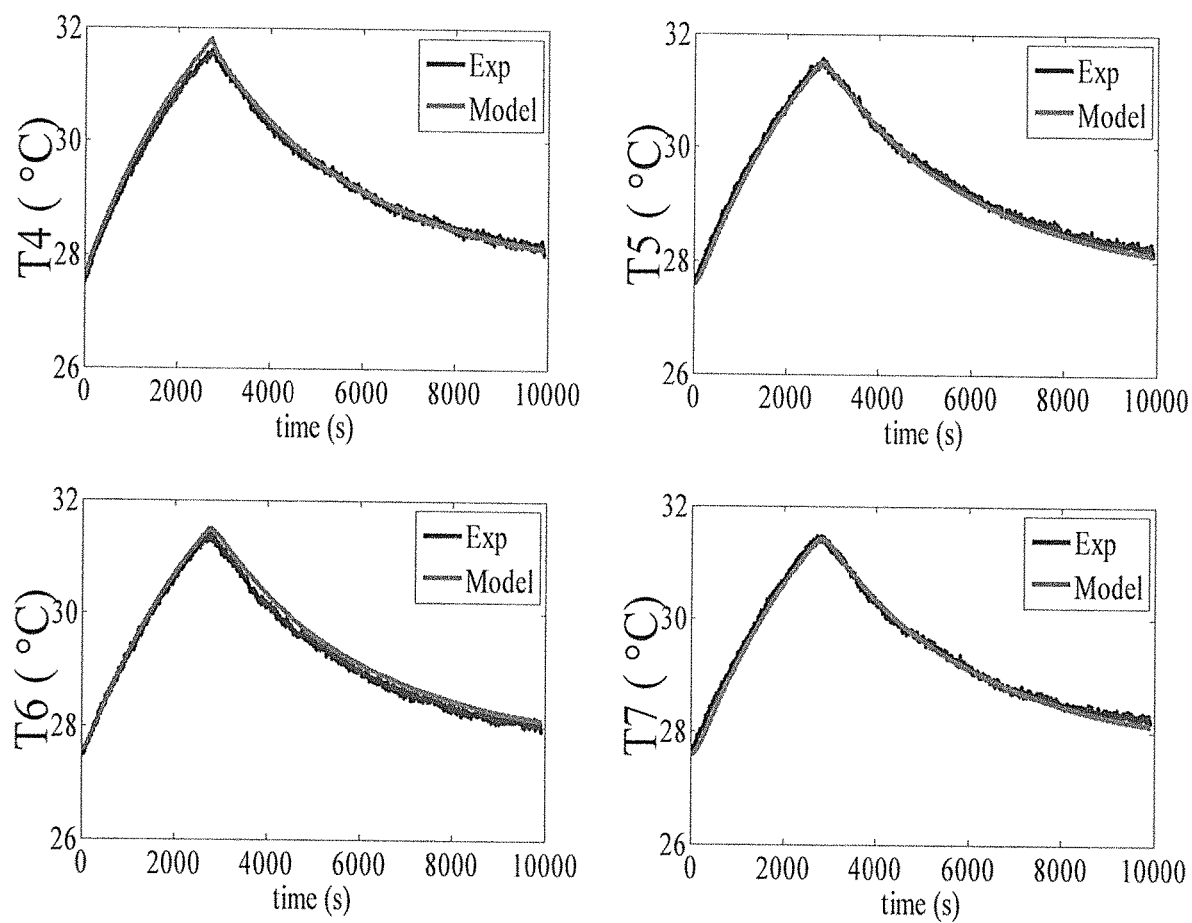
FIG. 14A summarizes validation results of the battery thermal model for the sensible heat region.
Figure 14B:
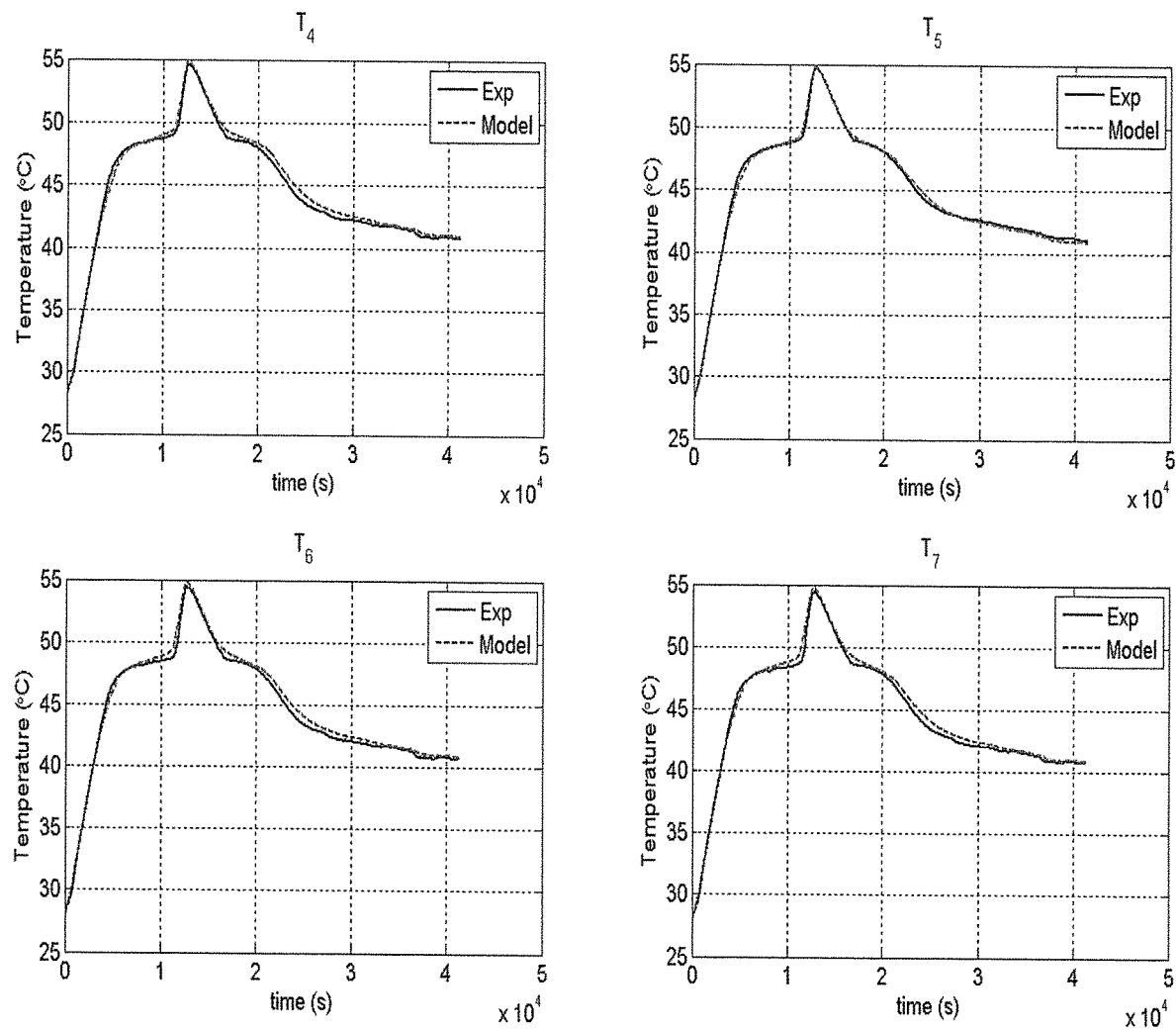
FIG. 14B summarizes validation results of the battery thermal model for the phase change region

The battery thermal model was validated in two modes of operation, the sensible heat region and the phase change region, by applying a certain heating patterns and comparing the model estimated temperatures with the measured temperatures. FIG. 14A shows a comparison between experimental and model estimated temperatures at four different locations for sensible heat region, and for the phase change region in FIG. 14B. The average error in temperature estimation was less than 0.1° C. for sensible heat region and 0.3° C. for phase change region.

Figure 15A:
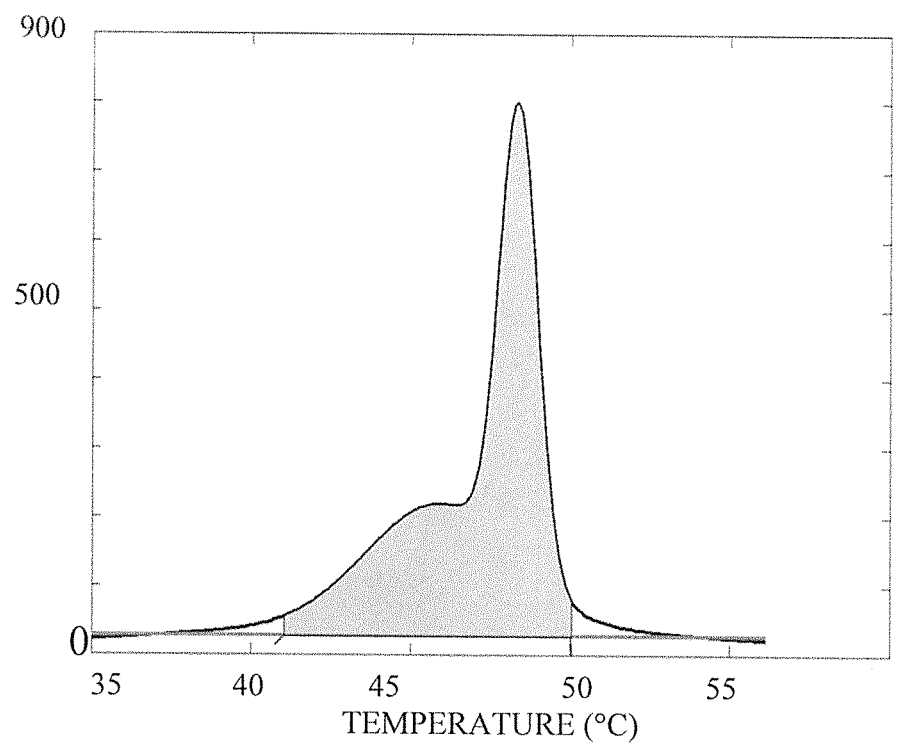
FIG. 15A is a plot of effective specific heat capacity vs temperature.

The phase change material specific and latent heat can be treated as a lumped "effective specific heat". The effective specific heat is determined as a function of temperature, as shown in FIG. 15A, using controlled heating and cooling experiments. The data from heating and cooling was fed to a Simulink solver for the thermal network model, which then identifies the specific heat function. Thermal state of charge is defined to be the percentage of latent heat remaining before the material is fully melted.

To execute the T-SoC algorithm, the battery current and temperatures were provided as inputs to the electrical model, from which cell heat generation was calculated. The cell heat generation is fed to the battery thermal model, which calculates the temperatures throughout the battery pack. Finally, the T-SoC was determined from a lookup table, shown in FIG. 15B, using the location-specific temperatures.

Figure 15B:
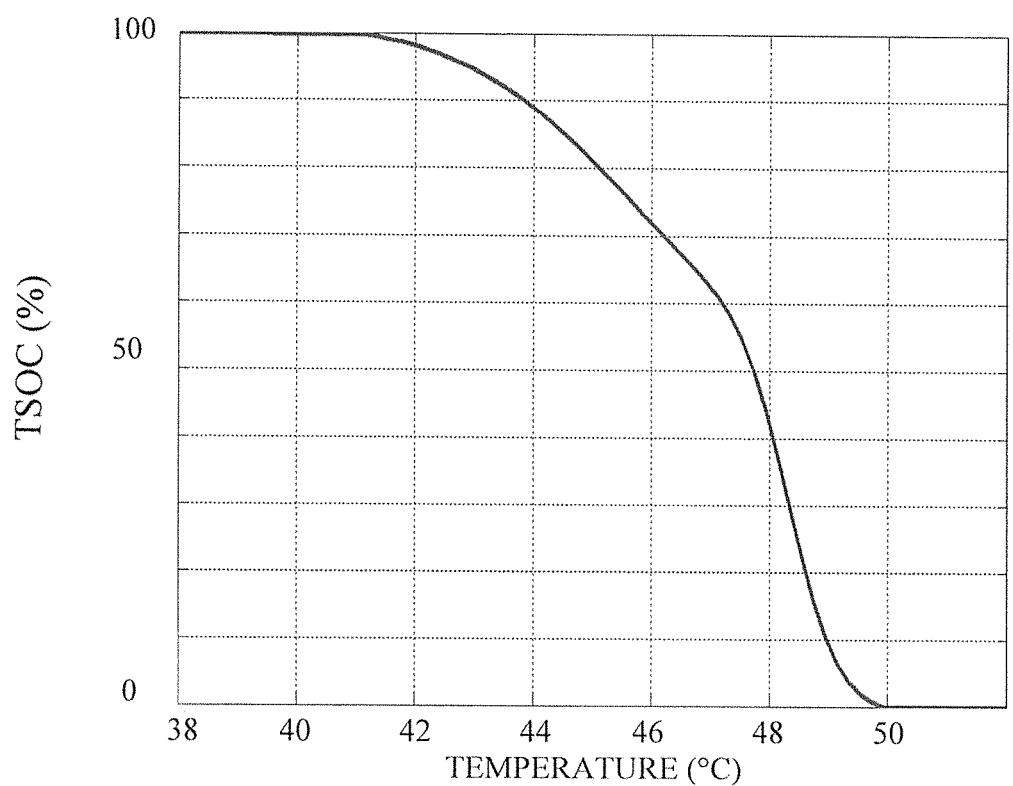
FIG. 15B is a plot of TSoC vs temperature.

In embodiments of this invention, such as demonstrated by FIGS. 15A-B, the melt fraction or the thermal state-of-charge is 95% at a first temperature of the phase change material, the melt fraction or the thermal state-of-charge is 50% at an intermediate second temperature of the phase change material, the melt fraction or the thermal state-of-charge is 5% at a third temperature of the phase change material, where the first temperature is less than the second temperature and the second temperature is less than the third temperature. Furthermore, the difference between the first temperature and the second temperature is at least twice the difference between the second temperature and the third temperature. In another embodiment, the melt fraction or the thermal state-of-charge is 95% at a first temperature of the phase change material, the melt fraction or the thermal state-of-charge is 5% at a second temperature of the phase change material, and a first derivative of the melt fraction or the thermal state-of-charge versus temperature is zero at a third temperature between the first and second temperatures of the phase change material. A second derivative of the melt fraction or the thermal state-of-charge versus temperature is zero at a fourth temperature between the first and third temperatures of the phase change material.

Figure 16:
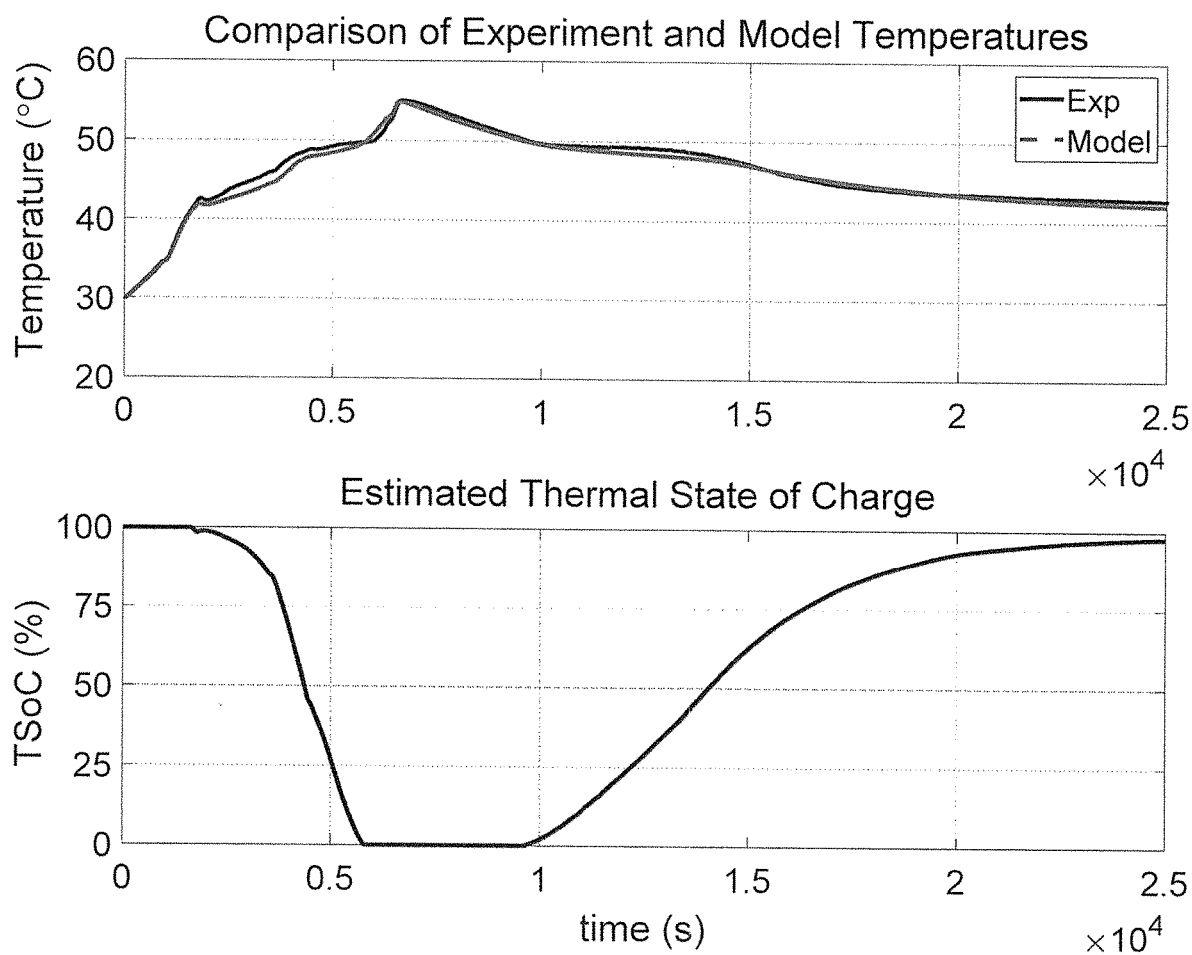
FIG. 16 is a plot of estimated temperature and TSoC.

The overall model, which included the three sub-models, was validated experimentally by performing charging and discharging cycles on the battery. FIG. 16 shows a sample of the estimated temperatures from which the thermal state of charge was calculated based on the melt fraction model.

The T-SoC will then be used by the BMS to determine if the battery power should be de-rated and, in some embodiments of this invention, what information should be presented to the user, so they can decide how to proceed with further battery operation. Once T-SoC reaches 0% (i.e.—the phase change material is completely melted), the BMS can or will halt battery operation.

The invention illustratively disclosed herein suitably may be practiced in the absence of any element, part, step, component, or ingredient which is not specifically disclosed herein.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

What is claimed is:

1. A battery system comprising:
a plurality of electrochemical cell elements;
a supply of a phase change material in thermal contact with the plurality of electrochemical cell elements whereby the phase change material absorbs at least a portion of heat generated upon a charge or discharge of electric power from the plurality of electrochemical cell elements, the phase change material having a thermal conductivity; and
a battery management system that monitors a thermal storage capacity of the phase change material and automatically controls a power of the plurality of electrochemical cell elements as a function of the thermal storage capacity of the phase change material.

2. The battery system of claim 1, wherein the battery management system automatically adjusts a power output of the plurality of electrochemical cell elements as a function of the thermal storage capacity of the phase change material to provide a heat output within a predetermined safe temperature limit.

3. The battery system of claim 1, wherein the battery management system automatically predicts or estimates a melt fraction or a thermal state-of-charge of the phase change material.

4. The battery system of claim 3, further comprising sensors for at least one of: electrical current, electrochemical cell element temperature, or ambient temperature, wherein the battery management system predicts or estimates the melt fraction or the thermal state-of-charge of the phase change material from data of the sensors.

5. The battery system of claim 3, wherein the battery management system predicts or estimates the melt fraction or the thermal state-of-charge of the phase change material as a function of latent heat of the phase change material.

6. The battery system of claim 3, wherein the battery management system predicts or estimates the melt fraction or the thermal state-of-charge from predetermined values using measured temperatures throughout the supply of phase change material.

7. The battery system of claim 3, wherein:
the melt fraction or the thermal state-of-charge is 95% at a first temperature of the phase change material,
the melt fraction or the thermal state-of-charge is 50% at an intermediate second temperature of the phase change material,
the melt fraction or the thermal state-of-charge is 5% at a third temperature of the phase change material,
the first temperature is less than the second temperature and the second temperature is less than the third temperature, and
the difference between the first temperature and the second temperature is at least twice the difference between the second temperature and the third temperature.

8. The battery system of claim 3, wherein:
the melt fraction or the thermal state-of-charge is 95% at a first temperature of the phase change material,
the melt fraction or the thermal state-of-charge is 5% at a second temperature of the phase change material,
a first derivative of the melt fraction or the thermal state-of-charge versus temperature is zero at a third temperature between the first and second temperatures of the phase change material, and
a second derivative of the melt fraction or the thermal state-of-charge versus temperature is zero at a fourth temperature between the first and third temperatures of the phase change material.

9. The battery system of claim 1, wherein the battery management system automatically determines or estimates more than one of: a battery state of charge, a battery heat generation, a battery temperature, or a melt-fraction of the phase change material.

10. The battery system of claim 1, further comprising:
a containment lattice member disposed around the plurality of electrochemical cell elements and including a plurality of openings containing the supply of the phase change material is disposed; and
temperature sensors placed at various positions on or throughout the containment lattice member, wherein the battery management system estimates the thermal storage capacity of the phase change material using measured temperature data of the plurality of electrochemical cell elements or the containment lattice member.

11. The battery system of claim 10, wherein the battery management system comprises: an electro-thermal module configured to determine and output electrochemical cell heat generation; a battery thermal module configured to determine and output battery temperature; and a melt-fraction module configured to estimate a remaining thermal storage capacity of the phase change material state of charge.

12. A battery system comprising:
an electrochemical cell array including a plurality of electrochemical cell elements and
a thermal management matrix at least in part enveloping the electrochemical cell array and in thermal contact therewith, the thermal management matrix comprising a supply of phase change material disposed at least in part in a heat conductive lattice, the thermal management matrix dissipating at least a portion of heat generated upon activation of at least a portion of the electrochemical cell array enveloped by the thermal management matrix; and
a battery management system for monitoring a thermal storage capacity of the thermal management matrix as a function of a melt fraction or a thermal state-of-charge of the phase change material.

13. The battery system of claim 12, wherein adjacent electrochemical cell elements are at least in part spaced apart by the thermal management matrix comprising a graphite or a polymer composite lattice and the phase change material comprises an encapsulated hydrated salt and a phase change temperature of about 5° C. to 85° C.

14. The battery system of claim 12, wherein the battery management system automatically adjusts a performance and an available power of the electrochemical cell array to ensure sufficient latent heat of the thermal management matrix is available to store a battery heat.

15. The battery system of claim 12, further comprising a communication module that communicates a modulated power and energy status to a device controller or a user.

16. The battery system of claim 12, wherein adjacent electrochemical cell elements are at least in part spaced apart by the thermal management matrix comprising a graphite lattice and the phase change material comprises an encapsulated paraffin wax and a phase change temperature of about 5° C. to 85° C.

17. The battery system of claim 12, wherein the battery management system automatically estimates the melt fraction or the thermal state-of-charge of the phase change material and automatically adjusts a power output of the plurality of electrochemical cell elements as a function of the thermal storage capacity of the phase change material to provide a heat output within a predetermined safe temperature limit.

18. The battery system of claim 12, further comprising sensors in combination with the thermal management matrix for at least one of: electrical current, electrochemical cell element temperature, or ambient temperature, wherein the battery management system estimates the melt fraction or the thermal state-of-charge of the phase change material from data of the sensors.

19. The battery system of claim 12, wherein the battery management system estimates the thermal storage capacity of the phase change material using measured temperature data of the plurality of electrochemical cell elements and the thermal management matrix.

20. The battery system of claim 12, wherein the battery management system comprises: an electro-thermal module configured to determine and output electrochemical cell heat generation; a battery thermal module configured to determine and output battery temperature; and a melt-fraction module configured to estimate a remaining thermal storage capacity of the phase change material state of charge.

21. A method of operating a power supply system, the method comprising:
- discharging at least one cell element to produce a quantity of power and a quantity of heat;
- absorbing at least a portion of the quantity of heat in a phase change material in thermal contact with the discharging cell element;
- subsequently releasing at least a portion of the absorbed quantity of heat from the phase change material to heat the at least one cell element;
- determining a cell element heat generation;
- determining a power supply system temperature;
- estimating a thermal storage capacity of the phase change material state of charge as a function of the determined cell element heat generation and power supply system temperature;
- monitoring the thermal storage capacity of the phase change material; and
- adjusting a power output of the at least one cell element as a function of the thermal storage capacity.

* * * * *